United States Patent [19]

Finke et al.

[11] Patent Number: 4,921,097
[45] Date of Patent: May 1, 1990

[54] DISPLAY CASE FOR A JACKETED CASSETTE

[75] Inventors: Malcolm K. Finke, Chicago; Marshall Weinstein, Riverwoods, both of Ill.; Kenneth J. Muderlak, Shorewood, Wis.

[73] Assignee: Specialty Store Services, Inc., Chicago, Ill.

[21] Appl. No.: 388,585

[22] Filed: Aug. 1, 1989

[51] Int. Cl.[5] .................................. B65D 85/672
[52] U.S. Cl. ............................... 206/387; 206/1.5; 206/45.34; 206/807
[58] Field of Search ............... 206/1.5, 309, 312, 387, 206/807, 45.34; 312/8, 10

[56] References Cited

U.S. PATENT DOCUMENTS

| 3,763,994 | 10/1973 | Somers | 206/387 |
|---|---|---|---|
| 3,828,922 | 8/1974 | Holkestad | 206/387 |
| 4,285,429 | 8/1981 | MacTavish | 206/387 |
| 4,365,712 | 12/1982 | Oishi et al. . | |
| 4,558,782 | 12/1985 | Iverson et al. | 206/387 |
| 4,561,544 | 12/1985 | Reeve | 206/1.5 |
| 4,572,369 | 2/1986 | Morris | 206/807 |
| 4,627,534 | 12/1986 | Komiyama et al. | 206/387 |
| 4,678,080 | 7/1987 | Nelson . | |
| 4,718,547 | 1/1988 | MacTavish | 206/309 |
| 4,733,916 | 3/1988 | Seufert . | |
| 4,759,442 | 7/1988 | Gregerson et al. | 206/1.5 |
| 4,784,264 | 11/1988 | Sykes . | |
| 4,802,601 | 2/1989 | Pijanowski et al. . | |
| 4,805,769 | 2/1989 | Soltis et al. | 206/1.5 |
| 4,834,238 | 5/1989 | Hehn et al. | 206/387 |

FOREIGN PATENT DOCUMENTS 2079726 1/1982 United Kingdom ............... 206/387

Primary Examiner—David T. Fidei
Attorney, Agent, or Firm—Neuman, Williams, Anderson & Olson

[57] ABSTRACT

A display case for jacketed cassettes includes a casing that defines an internal cavity and a protrusion that projects into the cavity. The casing provides an opening that permits the slidable withdrawal of a cassette from the display case in a well-defined, unique and predetermined direction. The protrusion is attached to the lid of the casing that is movable between open and closed positions and is engaged with the jacket on closing the lid to prevent the movement of the jacket in the direction of withdrawal of the cassette. Locking means keep the lid in closed position once engagement with the jacket has been achieved. The display case of the invention permits the cassette and the entire, unaltered advertising wrap or jacket to be conveniently displayed by the retailer and ultimately transported by the renter or user who chooses the video tape for viewing.

22 Claims, 1 Drawing Sheet

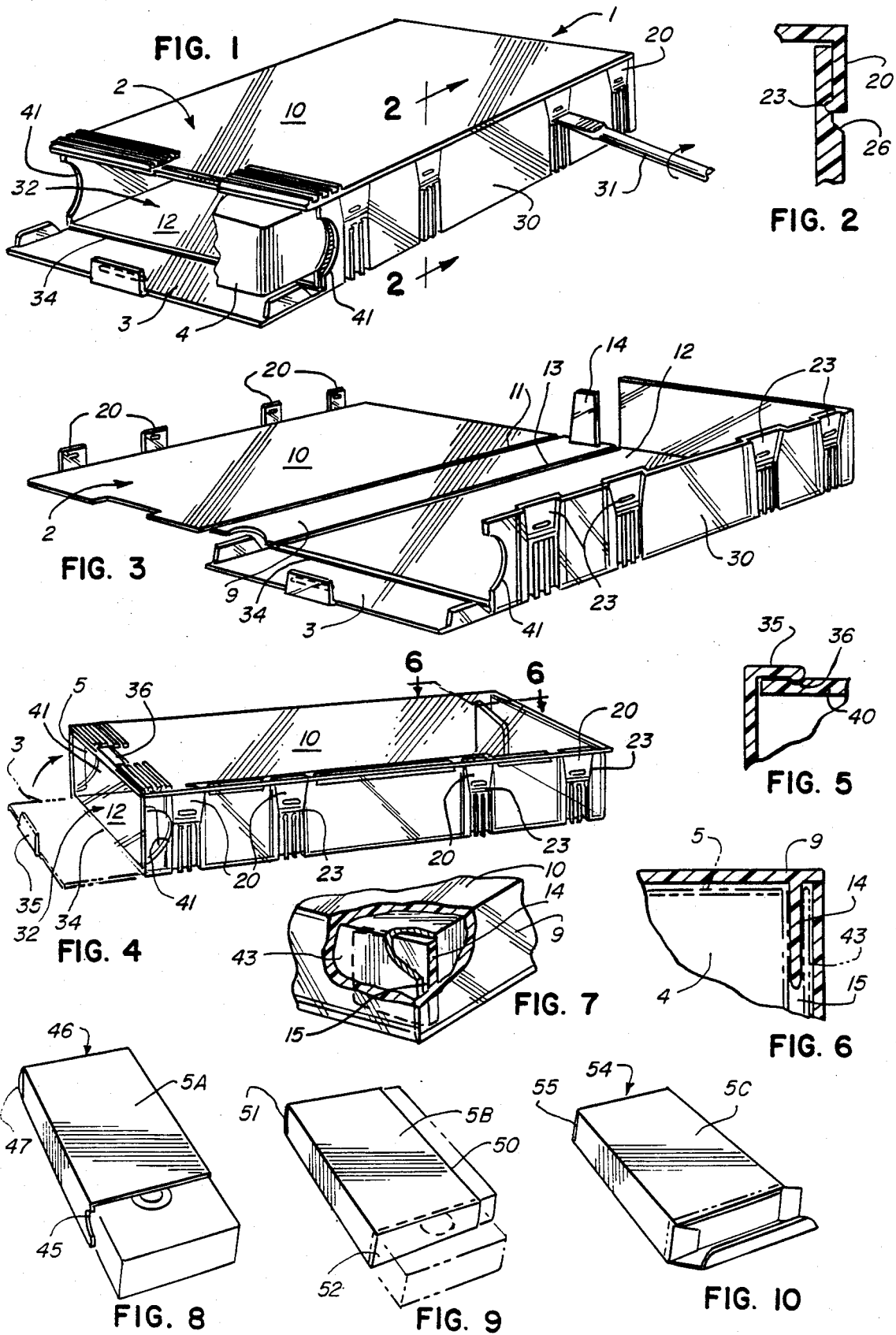

DISPLAY CASE FOR A JACKETED CASSETTE

BACKGROUND OF THE INVENTION

1. Field Of The Invention

The invention relates to video cassette display cases and, more particularly, to display cases for video cassettes in libraries or rental stores that enable information presented on the cassette advertising wrap or jacket to be viewed by the customer while maintaining the advertising wrap or jacket in substantially original condition, and allowing the slidable removal of the video cassette while preventing the customer from removing the advertising wrap or jacket from the protective display case.

2. Description Of The Prior Art

Video rental stores often experience problems with the theft of cassettes and the packaging therefor, including the advertising wrap or jacket for the cassette (hereinafter the cassette "jacket"). Not only a cassette, but also its jacket is a valuable item because the resale value of a cassette is substantially greater when it is sold in its original jacket. The proprietor of a rental store who wants to sell cassettes after their profitable rental life has expired desires to protect the cassette jackets against damage and theft in order to maximize the resale value of the cassettes. For this reason, some retailers and distributors in the video rental business prefer not to display and/or rent the video cassette in its original packaging, and instead place the cassette in some other form of generic wrapping.

However, cassette jackets are designed and intended to sell and promote the cassette, and contain printed information to entice the customer into choosing a cassette for sale or rental. Recognizing that the cassette jackets substantially enhance the marketing tone in the store, the retailer or distributor often places the original jackets in a part of the store which is accessible to the public, so that prospective customers can casually look through them and make their selections. The jacket is therefore constantly being handled and manipulated. Over a period of time, the jacket inevitably will become soiled and damaged. Moreover, the unprotected jacket, subjected to the public's inspection and handling in the store, experiences significant wear and tear.

It is a fairly common practice to display cassette display cases which contain the cassette jacket and which do not contain the cassette; instead, the cassette is provided to the customer at the time of purchase or rental. The separate display and inventory of the jackets and cassettes, respectively, is inconvenient, inefficient and uneconomical because it wastes valuable space in the facility.

Furthermore, when cassettes in their original jackets are stored in the public section of a store, both the jacket and the cassette are accessible to and may be concealed readily by thieves. At the present time, cassette storage boxes do not enable a retailer or distributor to retain and display the jacket in substantially unaltered form within the storage box in a way which also discourages the theft and damage of the cassette jacket. For example, in Sykes U.S. Pat. No. 4,784,264 the printed advertising wrap or jacket is merely inserted in the sleeve between the inner wall of the storage box and an outer flexible transparent sheet bonded to the edge of the storage box. See FIG. 6 of the Sykes patent. Moreover, the jacket must be substantially altered by cutting the jacket so that it will lie flat in order to fit the sleeve of the Sykes storage box; thus, the resale value of the jacket is substantially diminished.

It is desirable therefore to provide a display case for video cassettes that enables cassettes to be displayed and transported in their original, uncut jackets and that also enables users or renters to benefit from the eye-catching promotional and informational material available on the jackets, without encouraging theft of the jacket, and while simultaneously protecting the jacket against soiling or damage. It also is desirable that a cassette can be readily removed from its display case by a customer without the jacket being manipulated, soiled or damaged.

OBJECTS OF THE INVENTION

Accordingly, it is an object of this invention to provide an improved cassette display case that meets the aforementioned requirements.

It is a specific object of this invention to provide a cassette display case that displays a cassette in its original substantially unaltered jacket, and is pilfer resistant in that it discourages theft of the jacket.

It is also an object of the invention to provide a cassette display case that permits a cassette and the accompanying substantially unaltered advertising wrap or jacket to be conveniently and efficiently displayed and ultimately transported to a viewing place by the renter or user.

It is another object of this invention to provide a cassette display case that enables the cassette to be easily removed from the display case without the jacket being handled or removed.

It is a further object of this invention to provide a cassette display case that at all times protects the cassette jacket from damage and soiling.

It is another object of this invention to provide a cassette display case that is inexpensive to manufacture, durable, easy to use and which conveniently stores a cassette and its jacket in an attractive and functional manner.

SUMMARY OF THE INVENTION

In accordance with one embodiment of this invention a display case for displaying jacketed cassettes which achieves the foregoing objects includes a casing that defines an internal cavity and a protrusion that projects into the cavity. The casing provides an opening that permits the slidable withdrawal of a cassette from the display case in a well-defined, unique and predetermined direction. The protrusion projects into the cavity in a direction substantially transverse to the predetermined withdrawal direction and is adapted to engage with the jacket of a cassette located in the cassette display case to prevent it from being withdrawn in the predetermined direction without interfering with the withdrawal of a cassette. Locking means to maintain the protrusion and jacket in engaging relation are provided.

The casing may be of rectangular configuration having a lid operable between open and closed positions in book style fashion, to provide access for a jacketed cassette to the cavity in a direction perpendicular to the opening for slidable withdrawal of the cassette.

The lid (2) may be connected to the rest of the casing by a living hinge (13). The lid may comprise one or two panels of the display case. For example, to facilitate insertion of a cassette into the display case, the lid may include a side panel (9) and a cover panel (10) in hinged relation (11) attached to the rest of the casing by living hinges. The cover panel and side panel then lie flat to permit easy access for a cassette and jacket to be placed inside the display case. Alternatively, the lid may comprise one panel attached to the rest of the casing by a hinge such as living hinge (13).

The display case may be made of a plastic material and may be transparent to enable the advertising wrap or jacket of the cassette to be fully visible.

The protrusion (14) may be attached to the lid enabling the jacket to be engaged by the protrusion on closure of the lid. A snap clasp that must be pried apart with a lever may then be used to provide the locking means to maintain the lid in closed position to retain the protrusion in engaging relation with the jacket.

BRIEF DESCRIPTION OF THE DRAWINGS

For a more complete understanding of this invention, reference should now be made to the embodiment illustrated in greater detail in the accompanying drawings and described by way of example only. In the drawings:

FIG. 1 is a perspective view of the display case in locked condition, with the cassette partially removed, and showing the screw driver or tool necessary to open the lock tabs;

FIG. 2 is a sectional view through a lock tab (20) of FIG. 1 showing the lock tab in fully closed position;

FIG. 3 is a perspective view of one embodiment of a display case fully open to allow the initial insertion of a cassette in its original jacket;

FIG. 4 is a perspective view of the display case of FIG. 1 showing the position of the protrusion when the lid is in its partially closed position;

FIG. 5 is a sectional view through the closure tab (35) of FIG. 4 showing the end cap in its closed position;

FIG. 6 is a sectional view through the protrusion (14) of FIG. 4 showing the protrusion in operative engagement with the cassette jacket;

FIG. 7 is a fragmentary, exterior view of the corner shown in FIG. 6 with the video cassette display case and cassette jacket partially broken away to show the protrusion in operative engagement with the cassette jacket;

FIGS. 8-10 show a variety of types of video cassette jackets adapted for use with the display case of FIG. 1.

DETAILED DESCRIPTION OF THE DRAWINGS

Turning first to FIGS. 1, 3 and 4, a transparent cassette display case 1 can be seen in partially closed, completely open and partially closed positions, respectively. As seen in FIG. 3, to insert a cassette in its jacket into the display case 1, the display case 1 is fully opened. The lid 2 and end cap 3 are both open for a video cassette 4 in a jacket 5 (seen in FIG. 6) to be placed in position. The lid 2 may comprise a side panel 9 and a cover 10. When the lid is comprised of a cover 10 and a side panel 9, the cover is attached to the side panel 9 by a living hinge 11, and the side panel 9 is attached to the base of the display case 12 at living hinge 13 to enable it to be moved to the partially closed position shown in FIGS. 1 and 4.

On closing the lid 2, protrusion 14 is inserted into a slot or cut 15 (seen in FIGS. 6 and 7) in the end of the jacket. Lock tabs 20 attached to the lid 2, snap tightly into recesses 23 in receiving side wall 30, shown most clearly in FIGS. 1, 2 and 3, to secure the lid 2 in closed position. This closure is semi-permanent and can only be opened with the aid of a leverage implement such as a screwdriver 31. This leverage implement can be inserted into the interval 26 (seen in FIG. 2) at the ends of the tabs 20 when in their closed position and used to provide leverage to pry the lid 2 open. The security of this closure prevents the lid 2 from being surreptitiously opened by customers without drawing the attention of employees in the store thereby ensuring that the protrusion 14, whose function will be described later, is maintained in position in the slot or cut 15.

Alternatively, the lock tabs 20 may be locked in by any means sufficient to forcibly retain the lock tabs in position in a semi-permanent manner. For example, the lock tabs may be screwed into position.

When the lid 2 is in a closed position, the cassette 4 can still be removed from the display case through the opening 32 as shown in FIG. 1. The end cap 3 is connected to the base 12 by living hinge 34 and can be moved between open and closed positions. When in its closed position, the cassette is retained within the display case and is prevented from falling from the display case when the case is picked up by customers who transport the cassette display case along with its contents, or who want to read the information provided on the jacket through the transparent display case.

As shown in FIG. 4, the end cap 3 has a closure tab 35 that fits into a mating recess 36 located on the lid 2 to hold it in the closed position for protection of the cassette during storage or while transporting the display case and its contents. This closure is easily opened by the customer or the retailer to enable the cassette 4 to be removed. The cassette is drawn from the display case through the opening 32. Finger holes 41 make it easier to grasp the cassette to remove it from the display case 1.

Although the design of the display case 1 allows the cassette to be removed very easily through the opening 32, the cassette jacket 5 cannot be removed in the same way. The protrusion 14 inserted in the slot or cut 15 in the jacket 5 prevents the jacket 5 from sliding out through the opening 32. See FIGS. 6 and 7. As the jacket 5 is pulled toward the opening 32, the protrusion 14 makes contact with the back end 43 of the jacket. This contact restrains the jacket against further movement toward the opening thereby retaining it at all times within the protective display case 1.

Although the preferred embodiment for the protrusion is depicted in FIGS. 6 and 7, the invention is not meant to be limited to the protrusion shown. Indeed, the protrusion may be any means of suitable size, shape or form which simultaneously acts to retain the jacket within the cassette display case and which permits withdrawal of the cassette. For example, the protrusion could comprise a thin plastic ridge adjacent to the end cap and attached to the lower inner edge of the side panel, base, and/or lid of the cassette display case. The ridge must be thick enough to retain the jacket and thin enough to permit withdrawal of the cassette. Additional modifications are also possible.

The cassette display case can be injection molded from a durable plastic material such as polypropylene, K-resin or any other material suitable to form a living hinge. The display case in the preferred embodiment is transparent in order to realize the benefit of utilizing the promotional material on the jacket.

The embodiment depicted in FIGS. 1 through 7 may be readily modified to accommodate jackets of different styles. For example, one alternative embodiment of the display case has a lid hinged along one shorter side and an end cap covering an opening in a longer side. Further, protrusion 14 could be located on and attached to either cover 10 or side panel 9 or on the base of the display case 12, and more than one protrusion may be provided.

FIGS. 8-10 include three designs of video cassette jackets currently used. The first type of jacket 5A, shown in FIG. 8 has an open end 45 and a closed end 46. The closed end 46 has a back flap that folds over to secure the end closed. This provides a ready made slot 47 at the far end of the jacket adapted to receive the protrusion 14. The jacket is kept within the display case 1 by contact between the protrusion 14 and the back flap. The cassette, however, can be pulled from the display case through the open end 45 that falls in perfect alignment with the opening 32 in the display case 1.

Jacket 5B that has a side opening 50, shown in FIG. 9, has no ready-made slot into which the protrusion 14 can be inserted. Such a jacket must therefore be modified slightly to realize fully the benefits of the display case. A cut 51 must therefore be made into which the protrusion 14 can be inserted to prevent the jacket from being pulled out through the opening 32 in the display case 1. To fully realize the benefits of the display case, the jacket 5B also must be modified to provide an opening 52 at the short end of the jacket to enable the cassette to be removed from the display case 1 when the lid 2 is in its closed position.

An alternative embodiment of the display case having a lid hinged along one shorter side of the casing and an end cap covering an opening in a longer side thereof would be better adapted for utilization with cassettes in jackets similar to that of jacket 5B in FIG. 9. The protrusion would be located on the lid in similar fashion to protrusion 14 of FIG. 1 and would slide into a ready-made slot in the jacket 5B. In this way, no alteration to the jacket would be necessary for use with this alternative embodiment of the display case.

The jacket 5C seen in FIG. 10, is closed at both ends. The flap at the back end 54, provides a slot 55, similar to slot 47 of the jacket of FIG. 8, to accept the protrusion 14. An opening in the opposite short end of the jacket may be provided to enable the cassette to be more easily removed from the display case when the lid 2 is in its closed position.

The display case described in detail above is therefore adapted for use with video cassettes with each of the presently available jacket designs, although alternative designs are envisaged that could be adapted for use with particular designs of jacket. It allows a video cassette to be displayed and transported in its original jacket and enables the cassette to be removed so that the jacket is forcibly retained within the display case and is not touched during removal of the cassette. In this way the jacket remains in pristine condition to entice the next consumer to rent the video cassette or until the retailer decides it is time to sell the cassette.

Moreover, the use of the protrusion to prevent the removal of a cassette jacket from the display case without the aid of a leverage or unlocking device will deter theft. The opportunist thief no longer will be able to conceal the jacket as easily because it will be restrained within the larger display case. As a result the resale value of the cassette is safeguarded, if not enhanced.

While one preferred embodiment is illustrated in detail, it will be understood, of course that the invention is not limited to this embodiment. Those skilled in the art to which the invention pertains may make modifications and other embodiments employing the principles of the invention, particularly upon considering the foregoing teachings.

What is claimed is:

1. A display case for displaying video cassettes having separable jackets, said case comprising:
   a sleeve having walls partially enclosing an internal cavity for accommodating a video cassette in its separable jacket and having a closed end of said sleeve and an open end of said sleeve for the slidable withdrawal of the video cassette from said display case and said jacket in a predetermined direction through the open end of said sleeve;
   a protrusion projecting into said cavity, in a direction substantially transverse to said predetermined direction, for engagement with the jacket of the video cassette, but not the video cassette itself, to prevent withdrawal of the jacket in said predetermined direction while simultaneously allowing slidable withdrawal of the video cassette from the jacket and said sleeve in said predetermined direction; and
   locking means for maintaining said protrusion in engaging relation with the jacket of the video cassette.

2. The display case of claim 1, wherein said sleeve and said closed end of said sleeve comprise a substantially rectangular parallelepiped having at least one open end for the slidable withdrawal of the video cassette from said display case.

3. The display case of claim 1, wherein at least one said wall of said sleeve is a lid which is openable to allow a video cassette in its separable jacket to be inserted in said cavity and closable to engage the jacket, but not the video cassette, with said protrusion, said display case further comprising locking means for maintaining said lid in a closed condition.

4. The display case of claim 3 wherein said locking means comprises tabs situated on said sleeve for engagement with mating recesses located on said lid.

5. The display case of claim 3 wherein said protrusion is located on said sleeve.

6. The display case of claim 3 wherein said locking means comprises tabs situated on said lid for engagement with mating recesses located on said sleeve.

7. The display case of claim 1 additionally comprising an end cap movable between open and closed positions to cover said open end of said sleeve.

8. The display case of claim 7 wherein said end cap includes latch means for holding said cap in said closed position.

9. The display case of claim 1 wherein said sleeve is formed from transparent polypropylene.

10. The display case of claim 1 wherein said sleeve is formed from transparent K-resin.

11. A display case for displaying video cassettes having separable jackets, said case comprising:
    a rectangular sleeve having walls partially enclosing an internal cavity said sleeve being adapted to accept a video cassette in its separable jacket, said sleeve further comprising a base panel, a side wall connected to a first edge of said base panel, a lid defined by two walls of said rectangular sleeve, said lid being moveable between open and closed positions and disposed along a second edge of said base panel, a hinge connecting said lid to said base panel, a first end wall closing one end of said sleeve, and an open second end to permit slidable withdrawal of the video cassette from said display case in a predetermined direction through said open second end of said sleeve;

a protrusion attached to said sleeve and projecting into said cavity, when said lid is in said closed position, in a direction substantially transverse to said predetermined direction, for engaging with the jacket of the video cassette, but not the video cassette itself, said protrusion preventing withdrawal of the jacket in said predetermined direction while permitting slidable withdrawal of the video cassette from said cavity and said jacket in said predetermined direction; and locking means to maintain said lid in said closed position to retain said engaging relation between said protrusion and the jacket.

12. The display case of claim 11 wherein said lid comprises a second side panel adjacent said base panel, a cover panel, and a second hinge attaching said second side panel to said cover panel.

13. The display case of claim 12 wherein said protrusion is located on said lid of said sleeve.

14. The display case of claim 11 wherein said locking means comprises tabs situated on said lid for engagement with mating recesses located on said side wall.

15. The display case of claim 12 wherein said protrusion is located on said second side panel in proximity to said first end wall.

16. The display case of claim 11 additionally comprising an end cap moveable between open and closed positions to cover said open second end of said sleeve.

17. The display case of claim 16 wherein said end cap is attached to said base panel by a living hinge.

18. The display case of claim 16 wherein said end cap includes latch means for holding said end cap in said closed position.

19. The display case of claim 11 wherein said case is formed from transparent polypropylene.

20. The display case of claim 11 wherein said case is formed from transparent K-resin.

21. The display case of claim 12 wherein said hinges are living hinges.

22. The display case of claim 11 wherein said locking means comprises tabs situated on said sleeve for engagement with mating recesses located on said lid.

* * * * *